United States Patent
Kobayashi et al.

(10) Patent No.: US 6,251,975 B1
(45) Date of Patent: Jun. 26, 2001

(54) DISPERSIBILITY IMPROVER FOR FLUORORESIN POWDERS, MODIFIER FOR ORGANIC RESINS, AND ORGANIC RESIN COMPOSITIONS

(75) Inventors: Hideki Kobayashi; Toru Masatomi, both of Chiba Prefecture (JP)

(73) Assignee: Dow Corning Toray Silicone Company, Ltd., Tokyo (JP)

( * ) Notice: Subject to any disclaimer, the term of this patent is extended or adjusted under 35 U.S.C. 154(b) by 0 days.

(21) Appl. No.: 09/345,333

(22) Filed: Jun. 30, 1999

(30) Foreign Application Priority Data

Oct. 30, 1998 (JP) ................................. 10-309607

(51) Int. Cl.⁷ ........................... C08G 77/24; C08G 77/14
(52) U.S. Cl. .................. 524/263; 524/261; 524/265; 524/266; 524/267; 524/268; 524/462; 524/545; 528/25; 528/26; 528/29; 528/31; 528/42
(58) Field of Search ................. 528/25, 26, 29, 528/31, 42; 524/261, 263, 265, 266, 267, 268, 462, 545

(56) References Cited

U.S. PATENT DOCUMENTS

| | | | |
|---|---|---|---|
| 4,748,225 | * 5/1988 | Yoshioka et al. | 528/26 |
| 5,047,491 | * 9/1991 | Saho et al. | 528/15 |
| 5,300,239 | * 4/1994 | Ozaki et al. | 252/86 |

FOREIGN PATENT DOCUMENTS

| | | | |
|---|---|---|---|
| 0 969 329 | 1/2000 | (EP) | C08G/77/385 |
| 9-286911 | 4/1997 | (JP) | C08L/69/00 |
| 22-128991 | 5/2000 | (JP) . | |

OTHER PUBLICATIONS

Beyou E. et al., "New Fluorinated Polysiloxanes Containing an Ester Function in the Spacer I. Synthesis and Characterization", Journal of Polymer Science, Polymer Chemistry Edition, US, John Wiley and Sons, New York, vol. 32, No. 9, Jul. 15, 1994, pp. 1673–1681.

Chemical Abstracts, vol. 132, Columus, Ohio, US, abstract No. 323032, Kobayashi, H. et al., "Perfluoroalkyl–containing siloxane–based dispersing agents for powdered fluoropolymers, the powdered polymers as modifiers for organic resins, and modified organic resins".

* cited by examiner

Primary Examiner—Robert Dawson
Assistant Examiner—Jeffrey B. Robertson
(74) Attorney, Agent, or Firm—Sharon K. Severance; Roger E. Gobrogge; Charles R. Richard

(57) ABSTRACT

This invention pertains to a dispersibility improver for fluororesin powders that has the ability to induce the uniform dispersion of fluororesin powders in organic resins; a modifier for application to organic resins wherein said modifier comprises fluororesin powder and the aforesaid dispersibility improver; and finally organic resin compositions that contain the aforesaid modifier and as a consequence have the ability to form uniform and transparent coatings having an excellent surface smoothness.

The dispersibility improver for fluororesin powders is a polyorganosiloxane whose molecule contains (F1) at least 1 organic group selected from the group consisting of polyoxyalkylene-functional organic groups, alkyl groups having at least 12 carbon atoms, and polydialkylsiloxane chain-containing organic groups, and (F2) at least 1 perfluoroalkyl-functional organic group with the general formula $-R^2-X-R^1-(CF_2)_aF$ wherein $R^1$ represents $C_1$ to $C_{10}$ divalent hydrocarbon groups, $R^2$ represents $C^1$ to $C_{20}$ divalent hydrocarbon groups, X is a group with the formula $-CO-$ or $-COO-$, and a is an integer with a value of at least 3.

16 Claims, No Drawings

DISPERSIBILITY IMPROVER FOR FLUORORESIN POWDERS, MODIFIER FOR ORGANIC RESINS, AND ORGANIC RESIN COMPOSITIONS

FIELD OF THE INVENTION

This invention relates to agents that improve the dispersibility (dispersibility improvers) of fluororesin powders, to modifiers for organic resins, and to organic resin compositions. More particularly, this invention relates to a dispersibility improver for fluororesin powders that can induce the uniform dispersion of fluororesin powders in organic resins, to a modifier for organic resins wherein said modifier comprises fluororesin powder and the aforesaid dispersibility improver, and to organic resin compositions that contain the aforesaid modifier and that as a result can form films with an excellent surface smoothness.

BACKGROUND OF THE INVENTION

The admixture of a fluororesin powder, e.g., Teflon™ powder, into organic resins is an already known strategy for improving the physical properties of organic resins. For example, Japanese Laid Open (Kokai or Unexamined) Patent Application Number Hei 9-286911 (286,911/1997) teaches the preparation of a highly impact-resistant polycarbonate resin composition by the addition of fibrillar polytetrafluoroethylene powder to polycarbonate resin. However, since fluororesin powders generally have low surface tensions, it has been quite difficult to achieve homogeneous dispersions of fluororesin powders in relatively high surface tension organic resins. As a result, there has been desire for the appearance of a method that can generate homogeneous dispersions of fluororesin powders in organic resins.

An object of this invention is to provide a dispersibility improver for fluororesin powders that has the ability to induce the uniform dispersion of fluororesin powders in organic resins.

Another object of this invention is to provide a modifier for application to organic resins wherein said modifier comprises fluororesin powder and the dispersibility improver.

An additional object of this invention is to provide organic resin compositions that contain the aforesaid modifier and as a consequence have the ability to form uniform and transparent coatings having an excellent surface smoothness.

SUMMARY OF THE INVENTION

This invention relates to a dispersibility improver for fluororesin powders wherein said dispersibility improver is a polyorganosiloxane whose molecule contains (F1) at least 1 organic group selected from the group consisting of polyoxyalkylene-functional organic groups, alkyl groups having at least 12 carbon atoms, and polydialkylsiloxane chain-containing organic groups, and (F2) at least 1 perfluoroalkyl-functional organic group with the general formula —$R^2$—X—$R^1$—$(CF_2)_a$F wherein $R^1$ represents $C_1$ to $C_{10}$ divalent hydrocarbon groups, $R^2$ represents $C_1$ to $C_{20}$ divalent hydrocarbon groups, X is a group with the formula —CO— or —COO—, and a is an integer with a value of at least 3.

This invention additionally relates to a modifier for organic resins comprising (A) fluororesin powder and (B) the polyorganosiloxane dispersibility improver.

The invention also relates to organic resin compositions comprising the admixture of components (A) and (B) into organic resin (C).

DETAILED DESCRIPTION OF THE INVENTION

The polyorganosiloxane (B) used in this invention contains in its molecule (F1) at least 1 organic group selected from the group consisting of polyoxyalkylene-functional organic groups, alkyl groups having at least 12 carbon atoms, and polydialkylsiloxane chain-containing organic groups and (F2) at least 1 perfluoroalkyl-functional organic group with the general formula —$R^2$—X—$R^1$—$(CF_2)_a$F.

The polyoxyalkylene-functional organic group can be expressed by groups with the general formula —$(R^3)_b$—O—$(R^4O)_c$—$R^5$ wherein $R^3$ is a divalent hydrocarbon group; $R^4$ is a $C_1$ to $C_4$ alkylene group; $R^5$ is the hydrogen atom, a monovalent hydrocarbon group, or an acyl group; b is 0 or 1; and c is an integer from 1 to 300 and preferably is an integer with a value of at least 5. This polyoxyalkylene-functional organic group can be specifically exemplified by:

—$C_3H_6O(C_2H_4O)_{12}CH_3$,
—$C_3H_6O(C_3H_6O)_{20}CH_3$,
—$C_3H_6O(C_2H_4O)_6(C_3H_6O)_{20}CH_3$,
—$C_3H_6O(C_2H_4O)_{20}H$,
—$C_3H_6O(C_3H_6O)_{40}H$,
—$C_3H_6O(C_2H_4O)_{20}(C_3H_6O)_{20}H$,
—$C_3H_6O(C_3H_6O)_{40}COCH_3$, and
—$C_3H_6O(C_2H_4O)_{20}(C_3H_6O)_{20}COCH_3$.

The alkyl having at least 12 carbons can be exemplified by n-dodecyl, n-tetradecyl, n-hexadecyl, and n-octadecyl.

The polydialkylsiloxane chain-containing organic group can be exemplified by groups with the following general formula

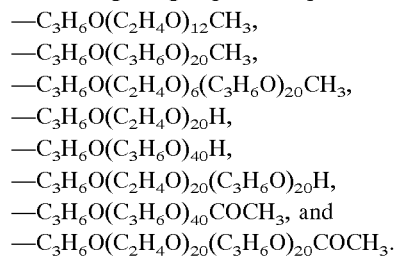

wherein R is a substituted or unsubstituted monovalent hydrocarbon group, $R^6$ is alkylene or alkyleneoxyalkylene, and c is defined as above. This group can be specifically exemplified by groups with the following formulas wherein Me is an abbreviation for the methyl group.

—$C_2H_4\{Me_2SiO\}_{40}Me_2SiC_4H_9$
—$C_2H_4\{Me_2SiO\}_{50}SiMe_3$
—$C_3H_6\{Me_2SiO\}_{40}Me_2SiC_4H_9$
—$C_2H_4\{Me_2SiO\}_{60}SiMe_3$ $R^1$ in the perfluoroalkyl-functional organic groups (F2) represents $C_1$ to $C_{10}$ divalent hydrocarbon groups, among which ethylene and propylene are preferred. $R^2$ represents $C_1$ to $C_{20}$ divalent hydrocarbon groups and preferably contains at least 3 carbon atoms. Decamethylene is particularly preferred for $R^2$. X is the —C(=O)— or —C(=O)O— group, the subscript a is an integer with a value of at least 3, preferably in the range of 4 to 10. The perfluoroalkyl-functional organic group can be specifically exemplified by:

—$C_{10}H_{20}COOC_2H_4C_4F_9$
—$C_{10}H_{20}COOC_2H_4C_6F_{13}$
—$C_{10}H_{20}COOC_2H_4C_8F_{17}$
—$C_4H_8COOC_2H_4C_8F_{17}$

—C$_3$H$_6$COOC$_2$H$_4$C$_8$F$_{17}$

—C$_{10}$H$_{20}$COC$_2$H$_4$C$_8$F$_{17}$

—C$_3$H$_6$COC$_3$H$_6$C$_8$F$_{17}$

—C$_2$H$_4$COC$_2$H$_4$C$_8$F$_{17}$

The polyorganosiloxane dispersibility improver can have, for example, a straight-chain, branched-chain, or cyclic molecular structure. In addition, the organic group (F1) is preferably bonded in side-chain position in this polyorganosiloxane, while the perfluoroalkyl-functional organic group with general formula (F2) is preferably bonded therein in side-chain position or molecular chain terminal position. The main chain of this polyorganosiloxane preferably has a degree of polymerization of at least 5. The molecular weight of the subject polyorganosiloxane is preferably from 1,000 to 1,000,000 and more preferably from 10,000 to 100,000. This polyorganosiloxane preferably has a fluorine content from 1 to 70 weight % and more preferably from 5 to 50 weight %. A full development of the ability to stabilize the dispersion of fluororesin powders will not occur at a fluorine content less than 1 weight %, while fluorine contents greater than 70 weight % cause a poor compatibility with organic resins.

Compounds as defined by the following general formula can be provided as typical examples of the polyorganosiloxane dispersibility improver.

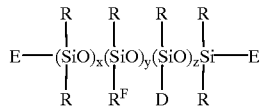

R denotes substituted and unsubstituted monovalent hydrocarbon groups and can be specifically exemplified by $C_1$ to $C_{30}$ alkyl, alkenyl, aryl, and arylalkyl. R will typically be methyl or phenyl.

$R^F$ represents (F2) the perfluoroalkyl-functional organic group with the general formula —$R^2$—X—$R^1$—$(CF_2)_a$F.

D denotes (F1) the organic group selected from polyoxyalkylene-functional organic groups, alkyl groups having at least 12 carbon atoms, and polydialkylsiloxane chain-containing organic groups.

E is a group selected from R, $R^F$, and D.

x is a number with a value from 0 to 500, y is a number from 0 to 500, z is a number from 1 to 500, and (x+y+z) preferably falls in the range from 2 to 1,000 and more preferably in the range from 5 to 1,000. The subscript y may be 0 when at least 1 of the terminal E groups is the perfluoroalkyl-functional organic group (F2).

In addition, the perfluoroalkyl-functional organic group (F2) and the organic group (F1) are preferably bonded in the subject polyorganosiloxane as graft chains along the siloxane backbone of the main chain.

The polyorganosiloxane dispersibility improver can be exemplified by the following compounds wherein Me=methyl.

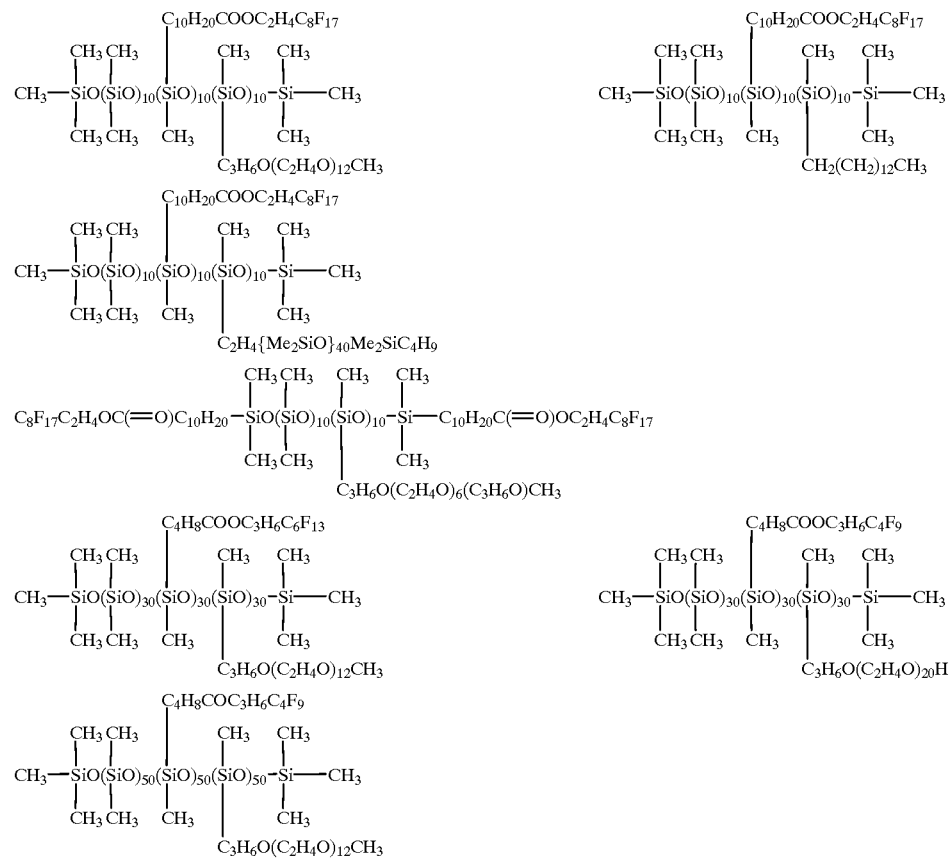

The polyorganosiloxane can be synthesized, for example, by the addition reaction of SiH-functional polyorganosiloxane, for example, methylhydrogenpolysiloxane with the formula

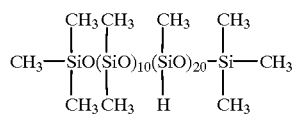

with (i) the alkenyl-functional polyoxyalkylene compound $CH_2=CHCH_2O(C_2H_4O)_{10}H$ or an alkenyl-functional hydrocarbon compound such as an α-olefin or a vinyl-functional dimethylpolysiloxane such as $CH_2=CH\{(CH_3)_2SiO\}_{40}(CH_3)_2SiR^8$ ($R^8$=monovalent hydrocarbon groups) and (ii) perfluoroalkyl-functional olefin with the formula $R^9—X—R^1—(CF_2)_aF$ ($R^1$, X, and a are defined as above and $R^9$ is a $C_1$ to $C_{20}$ monovalent hydrocarbon group that contains 1 carbon—carbon double bond) in the presence of an addition-reaction catalyst such as chloroplatinic acid with heating and optionally with the use of organic solvent.

The dispersibility improver for fluororesin powders has the ability both to improve the dispersibility of fluororesin powders in organic resins and to stabilize this dispersibility. The reasons underlying this performance are not clear. However, since the perfluoroalkyl-functional organic group (F2) is compatible with fluororesin powders, the organic group (F1) exhibits affinity for organic resins, and the polyorganosiloxane chain is itself very flexible, it is thought that the dispersibility improver becomes interposed between the fluororesin powder and organic resin and thereby promotes the dispersion of fluororesin powders in organic resins while also functioning to prevent aggregation of the fluororesin powder. The dispersibility improver will in general be used at from 0.1 to 30 weight parts per 100 weight parts of the fluororesin powder.

The modifier for organic resins comprises (A) fluororesin powder and (B) the polyorganosiloxane dispersibility improver.

The fluororesin powder (A) can be exemplified by tetrafluoroethylene resin powders, chlorotrifluoroethylene resin powders, tetrafluoroethylene-hexafluoroethylenepropylene resin powders, vinyl fluoride resin powders, vinylidene fluoride resin powders, and dichlorodifluoroethylene resin powders. This fluororesin powder preferably has an average particle size in the range from 0.05 to 100 μm.

The polyorganosiloxane (B) will in general be used at from 0.1 to 30 weight parts per 100 weight parts of the fluororesin powder (A).

An organic solvent may be added on an optional basis to the organic resin modifier. This solvent can be exemplified by chlorinated hydrocarbons such as dichloromethane, 1,2-dichloroethane, 1,1,2,2-tetrachloroethane, chloroform, 1,1,1-trichloroethane, carbon tetrachloride, monochlorobenzene, and dichlorobenzene; aromatic hydrocarbons such as benzene, toluene, xylene, and ethylbenzene; and ethers such as diethyl ether. Combinations of two or more of these organic solvents can also be used.

Conventional mixing methodologies can be used to mix the fluororesin powder (A) and polyorganosiloxane (B). For example, a Ross mixer, kneader mixer, two-roll mill, three-roll mill, or continuous mixer can be used to mix these components. Organic solvent can be added to the organic resin modifier and mixed therein using various emulsifying devices and dispersers, e.g., homogenizers, line mixers, ultradispersers, homomixers, nanomizers, microfluidizers, altimizers, and ultrasonic dispersers, or mixing devices such as mixers.

Admixture of the modifier into an organic resin has the effect of improving the water repellency and oil repellency of the organic resin. Another advantage provided by the resulting organic resin composition is the ability to form a uniform and transparent coating that has a very smooth surface.

Organic resin compositions comprise compositions afforded by the admixture into (C) organic resin of (A) fluororesin powder and (B) polyorganosiloxane.

The organic resin (C) can be exemplified by bisphenol A-type polycarbonate resins, bisphenol Z-type polycarbonate resins, silicone-modified polycarbonate resins, other polycarbonate resins, acrylic resins, styrene resins, copolymer resins of styrene and a (meth)acrylate ester such as methyl acrylate and methyl methacrylate, polyacetal resins, polyester resins, polyurethane resins, polyarylate resins, polysulfone resins, phenolic resins, and nylon resins. These may be used individually or mixtures of a plural number of resins may be used. Among the resins listed above, polycarbonate resins, acrylic resins, polyacetal resins, polyester resins, phenolic resins, and nylons are preferred and polycarbonate resins are particularly preferred.

The content of the fluororesin powder (A) in the organic resin composition in general will be from 0.01 to 60 weight parts and preferably is from 0.1 to 50 weight parts, in each case per 100 weight parts organic resin. The content of the polyorganosiloxane (B) in the organic resin composition in general will be from 0.01 to 50 weight parts and preferably is from 0.1 to 20 weight parts, in each case per 100 weight parts organic resin.

Organic resin compositions can be prepared, for example, by preliminarily preparing a mixture of (C) organic resin and (A) fluororesin powder and mixing this mixture with (B) the polyorganosiloxane, or by directly adding and mixing (B) the polyorganosiloxane and (A) fluororesin powder into (C) the organic resin, or by preliminarily dissolving (C) the organic resin in organic solvent and then adding (B) the polyorganosiloxane and (A) fluororesin powder to this organic solvent solution with mixing to homogeneity. The mixing referenced here can be effected using various emulsifying devices and dispersers, e.g., homogenizers, line mixers, ultradispersers, homomixers, nanomizers, microfluidizers, altimizers, and ultrasonic dispersers, or mixing devices such as mixers.

The dispersibility improver, when present in organic resin along with a fluororesin powder, is characterized by the ability to induce a uniform dispersion of the fluororesin powder in the organic resin. The modifier for application to organic resins is characterized by its ability to impart water repellency and oil repellency to organic resins. Finally, organic resin compositions are characterized by the ability to form uniform and transparent coatings having an excellent surface smoothness.

EXAMPLES

So that those skilled in the art can understand and appreciate the invention taught herein, the following examples are presented, it being understood that these examples should not be used to limit the scope of this invention found in the claims. In the following examples "parts" denotes "weight parts". The average particle size values reported in the examples for the fluororesin powders that were dispersed in the organic resins were measured using a Coulter Model N4MD instrument for measuring particle size from Coulter Electronics, Inc. The contact angles versus water and methylene iodide were measured using a CA-Z contact angle meter from Kyowa Kaimen Kagaku.

Synthesis Example 1

2 g SiH-functional polyorganosiloxane with the following average formula (designated below as P1, synthesized by equilibration polymerization)

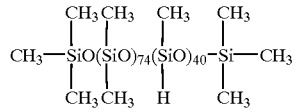

0.1 g platinum/tetramethyldivinyldisiloxane complex solution (amount providing a 20 ppm content of platinum metal proper), 11.5 g vinyl-functional polydimethylsiloxane with the formula $CH_2=CHMe_2SiO(Me_2SiO)_{50}SiMe_3$ (Me=methyl), 10 g perfluoroalkyl-functional olefin with the formula $CH_2=CHC_8H_{16}COOC_2H_4C_8F_{17}$, and 66 g toluene were placed in a flask, gradually heated to 60° C., and reacted at 60° C. for 4 hours. The solvent and low-boiling components were then removed by dropping the pressure to 50 torr at 100° C. Analysis of the resulting reaction product by $^{29}$Si-NMR, $^{13}$C-NMR, and FT-IR confirmed it to be polyorganosiloxane (designated below as P2) with the following average formula wherein Me=methyl.

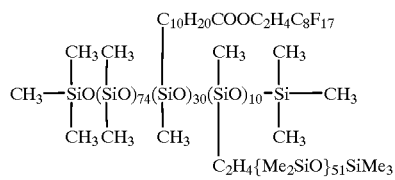

Synthesis Example 2

Polyorganosiloxane with the following average formula (hereafter designated as P3) was obtained operating as in Synthesis Example 1, but in this case using 7.6 g of the allyl-functional polyoxyalkylene compound $CH_2=CHCH_2O(C_2H_4O)_{24}(C_3H_6O)_{24}CH_3$ in place of the 11.5 g vinyl-functional polydimethylsiloxane that was used in Synthesis Example 1.

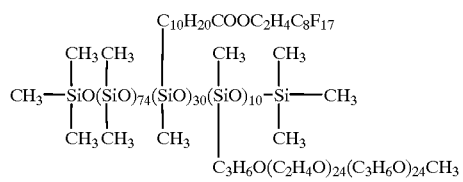

Synthesis Example 3

Polyorganosiloxane with the following average formula (hereafter designated as P4)

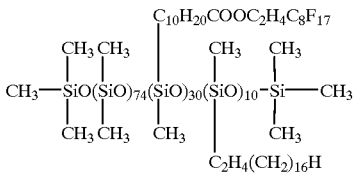

was synthesized according to the procedure described in Synthesis Example 1, but in this case using 0.76 g of the α-olefin $CH_2=CHC_{16}H_{33}$ in place of the 11.5 g vinyl-functional polydimethylsiloxane used in Synthesis Example 1.

Example 1

10 parts bisphenol Z-type polycarbonate resin (Z200 from Mitsubishi Gas Chemical Co., Inc.) was dissolved in 100 parts chlorobenzene followed by the addition with mixing to homogeneity of 1 part tetrafluoroethylene resin powder (DAIKIN-POLYFLON PTFE Lowpolymers from Daikin Industries, Ltd., primary particle size=5 μm, secondary particle size=0.3 μm) and 0.1 part of the polyorganosiloxane (P2) produced in Synthesis Example 1. This mixture was passed once through a microfluidizer (M-110Y from Mizuho Kogyo Kabushiki Kaisha) at 10,000 psi to yield a polycarbonate resin composition. The polycarbonate resin composition took the form of a homogeneously dispersed solution.

The composition was placed in a glass bottle and allowed to stand for 10 minutes, at which time its appearance was visually evaluated. Separation into a liquid layer and sediment layer was not observed. Measurement of the particle size of the dispersed particles (tetrafluoroethylene resin powder) in the composition gave an average particle size of 155 nm. A uniform and transparent coating was obtained when this composition was coated on a glass slide and dried in an oven. These measurement results are reported in Table 1. This uniform and transparent coating was submitted to contact angle measurement with the following results: contact angle versus water=105°, contact angle versus methylene iodide=60°.

Example 2

A polycarbonate resin composition was prepared as in Example 1, except polyorganosiloxane (P3) prepared in Synthesis Example 2 was used in place of the polyorganosiloxane (P2). This composition was placed in a glass bottle and allowed to stand for 10 minutes, at which point the appearance was visually inspected. Separation into a liquid layer and sediment layer was not observed. Measurement of the particle size of the dispersed particles (tetrafluoroethylene resin powder) in the composition gave an average particle size of 170 nm. A uniform and transparent coating was obtained when this composition was coated on a glass slide and dried in an oven. These measurement results are also reported in Table 1.

Example 3

A polycarbonate resin composition was prepared as in Example 1, except polyorganosiloxane (P4) prepared in Synthesis Example 3 was used in place of polyorganosiloxane (P2). This composition was also placed in a glass bottle and allowed to stand for 10 minutes, at which point the appearance was visually inspected. Separation into a liquid layer and sediment layer was not observed. Measurement of the particle size of the dispersed particles (tetrafluoroethylene resin powder) in the composition gave an average particle size of 175 nm. A uniform and transparent coating was obtained when this composition was coated on a glass slide and dried in an oven. These measurement results are also reported in Table 1.

Comparative Example 1

A polycarbonate resin composition was prepared as in Example 1, but in this case without adding polyorganosiloxane (P2). This composition was placed in a glass bottle and allowed to stand for 10 minutes, at which point the appearance was visually inspected. In this case separation into a liquid layer and sediment layer was observed. The average particle size of the dispersed particles (tetrafluoroethylene resin powder) in this composition was 1,270 nm. A nonuniform and opaque coating was obtained when this liquid was coated on a glass slide and dried in an oven. These measurement results are also reported in Table 1.

TABLE 1

| | Example 1 | Example 2 | Example 3 | Comparative Example 1 |
|---|---|---|---|---|
| status of the dispersion | Excellent | excellent | excellent | poor |
| separation into a liquid layer and sediment layer | Absent | absent | absent | present |
| average particle size (nm) | 155 | 170 | 175 | 1,270 |
| condition of the coating | uniform | uniform | uniform | nonuniform |

Comparative Example 2

10 parts bisphenol Z-type polycarbonate resin (Z200 from Mitsubishi Gas Chemical Co., Inc.) was dissolved in 100 parts chlorobenzene and the resulting solution was coated on a glass slide and dried in an oven. The coating afforded thereby was uniform and transparent. This uniform and transparent coating was submitted to contact angle measurement with the following results: contact angle versus water= 90°, contact angle versus methylene iodide=37°.

What is claimed is:

1. A polyorganosiloxane dispersibility improver wherein the polyorganosiloxane molecule contains
   (F1) at least 1 organic group selected from the group consisting of polyoxyalkylene-functional organic groups, alkyl groups having at least 12 carbon atoms, and polydialkylsiloxane chain-containing organic groups, and
   (F2) at least 1 perfluoroalkyl-functional organic group with the formula

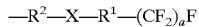

wherein $R^1$ represents $C_1$ to $C_{10}$ divalent hydrocarbon groups; $R^2$ represents $C_3$ to $C_{20}$ divalent hydrocarbon groups; X is a group with the formula —CO— or —COO—; and a is an integer with a value of at least 3.

2. The polyorganosilxoane dispersibility improver as claimed in claim 1, wherein the polyorganosiloxane has a degree of polymerization of at least 5.

3. The polyorganosiloxane dispersibility improver as claimed in claim 1 wherein (F1) is a polyoxyalkylene-functional organic group with the formula

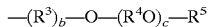

wherein $R^3$ is a divalent hydrocarbon group; $R^4$ is a $C_1$ to $C_4$ alkylene group; $R^5$ is the hydrogen atom, a monovalent hydrocarbon group, or an acyl group; b is 0 or 1; and c is an integer from 1 to 300.

4. A polyorganosiloxane dispersibility improver wherein the polyoryanosiloxane molecule contains
   (F1) an alkyl group having at least 12 carbon atoms, and
   (F2) at least 1 perfluoroalkyl-functional organic group with the formula

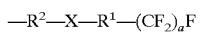

wherein $R^1$ represents $C_1$ to $C_{10}$ divalent hydrocarbon groups; $R^2$ represents $C_1$ to $C_{20}$ divalent hydrocarbon groups; X is a group with the formula —CO— or —COO—; and a is an integer with a value of at least 3.

5. A polyorganosiloxane dispersibility improver wherein the polyorganosiloxane molecule contains
   (F1) is a polydialkylsiloxane chain-containing organic group with the formula

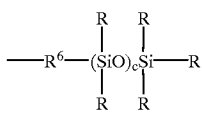

wherein R is a substituted or unsubstituted monovalent hydrocarbon group; $R^6$ is alkylene or alkyleneoxyalkylene; and c is an integer from 1 to 300, and
   (F2) at least 1 perfluoroalkyl-functional organic group with the formula

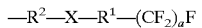

wherein $R^1$ represents $C_1$ to $C_{10}$ divalent hydrocarbon groups; $R^2$ represents $C_1$ to $C_{20}$ divalent hydrocarbon groups; X is a group with the formula —CO— or —COO—; and a is an integer with a value of at least 3.

6. The polyorganosiloxane dispersibility improver as claimed in claim 1 wherein the polvorganosiloxane has the formula

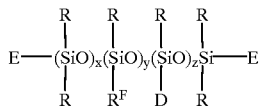

R formula denotes substituted or unsubstituted monovalent hydrocarbon groups;
   $R^F$ represents a perfluoroalkyl-functional organic group with the formula —$R^2$—X—$R^1$—$(CF_2)_a$F wherein $R^1$ represents $C_1$ to $C_{10}$ divalent hydrocarbon groups; $R^2$ represents $C_3$ to $C_{20}$ divalent hydrocarbon groups; X is a group with the formula —CO— or —COO—; and a is an integer with a value of at least 3;
   D denotes an organic group selected from polyoxyalkylene-functional organic groups, alkyl groups having at least 12 carbon atoms, or polydialkylsiloxane chain-containing organic groups;

E is a group selected from R, $R^F$, and D;

x is a number with a value from 0 to 500, y is a number from 0 to 500, z is a number from 1 to 500, and (x+y+z) falls in the range from 2 to 1000.

7. A modifier for organic resins comprising (A) fluororesin powder; and (B) polyorganosiloxane whose molecule contains
  (F1) at least 1 organic group selected from the group consisting of polyoxyalkylene-functional organic groups, alkyl groups having at least 12 carbon atoms, and polydialkylsiloxane chain-containing organic groups, and
  (F2) at least 1 perfluoroalkyl-functional organic group with the formula $$-R^2-X-R^1-(CF_2)_aF$$

wherein $R^1$ represents $C_1$ to $C_{10}$ divalent hydrocarbon groups; $R^2$ represents $C_1$ to $C_{20}$ divalent hydrocarbon groups; X is a group with the formula —CO— or —COO—; and a is an integer with a value of at least 3.

8. The modifier for organic resins as claimed in claim 7 wherein the fluororesin powder is selected from tetrafluoroethylene resin powders, chlorotrifluoroethylene resin powders, tetrafluoroethylene-hexafluoroethylenepropylene resin powders, vinyl fluoride resin powders, vinylidene fluoride resin powders, and dichlorodifluoroethylene resin powders.

9. The modifier for organic resins as claimed in claim 7 wherein the fluororesin powder had an average particle size in the range of 0.05 to 100 µm.

10. The modifier for organic resins as claimed in claim 7 wherein the polyorganosiloxane (B) is present in an amount from 0.1 to 30 weight parts per 100 weight parts of fluororesin powder (A).

11. The modifier for organic resins as claimed in claim 7 additionally comprising an organic solvent.

12. An organic resin composition comprising (A) fluororesin powder; and (B) polyorganosiloxane whose molecule contains
  (F1) at least 1 organic group selected from the group consisting of polyoxyalkylene-functional organic groups, alkyl groups having at least 12 carbon atoms, and polydialkylsiloxane chain-containing organic groups, and
  (F2) at least 1 perfluoroalkyl-functional organic group with the formula $$-R^2-X-R^1-(CF_2)_aF$$

wherein $R^1$ represents $C_1$ to $C_{10}$ divalent hydrocarbon groups; $R^2$ represents $C_1$ to $C_{20}$ divalent hydrocarbon groups; X is a group with the formula —CO— or —COO—; and a is an integer with a value of at least 3;

admixed into (C) an organic resin.

13. The organic resin composition as claimed in claim 12 wherein the organic resin is selected from the group consisting of bisphenol A-type polycarbonate resins, bisphenol Z-type polycarbonate resins, silicone-modified polycarbonate resins, acrylic resins, styrene resins, copolymer resins of styrene and a (meth)acrylate ester, polyacetal resins, polyester resins, polyurethane resins, polyarylate resins, polysulfone resins, phenolic resins, and nylon resins.

14. The organic resin composition as claimed in claim 12 wherein the polyorganosiloxane (B) is present in an amount from 0.01 to 50 weight parts per 100 weight parts of organic resin.

15. The organic resin composition as claimed in claim 12 wherein the fluororesin powder (A) is present in an amount from 0.01 to 60 weight parts per 100 weight parts organic resin.

16. The organic resin composition as claimed in claim 12 wherein there is additionally present an organic solvent.

* * * * *